(12) United States Patent
Richardeau et al.

(10) Patent No.: US 7,061,216 B2
(45) Date of Patent: Jun. 13, 2006

(54) STATIC ELECTRIC POWER CONVERTER FOR MODULATING ELECTRIC POWER EXCHANGED BETWEEN AT LEAST A VOLTAGE SOURCE AND A CURRENT SOURCE

(75) Inventors: Frédéric Richardeau, Flourens (FR); Henri Foch, Toulouse (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 0 days.

(21) Appl. No.: 10/503,629

(22) PCT Filed: Feb. 5, 2003

(86) PCT No.: PCT/FR03/00357

§ 371 (c)(1),
(2), (4) Date: May 5, 2005

(87) PCT Pub. No.: WO03/067745

PCT Pub. Date: Aug. 14, 2003

(65) Prior Publication Data

US 2005/0237038 A1    Oct. 27, 2005

(30) Foreign Application Priority Data

Feb. 8, 2002  (FR)  .................................. 02 01580

(51) Int. Cl.
*G05F 1/40*  (2006.01)

(52) U.S. Cl. ...................... 323/284; 323/244; 323/285
(58) Field of Classification Search ................ 323/222, 323/225, 235, 237, 282, 283, 284, 285, 300, 323/351, 244; 363/60, 79
See application file for complete search history.

(56) References Cited

U.S. PATENT DOCUMENTS

| | | | |
|---|---|---|---|
| 4,617,508 A | 10/1986 | Bloomer | ...................... 323/237 |
| 5,629,607 A | 5/1997 | Callahan et al. | ............. 323/237 |
| 5,680,034 A | 10/1997 | Redl | ........................... 323/235 |
| 5,737,201 A * | 4/1998 | Meynard et al. | .............. 363/60 |

\* cited by examiner

*Primary Examiner*—Jessica Han
(74) *Attorney, Agent, or Firm*—Young & Thompson

(57) ABSTRACT

A static electrical energy converter modulates the electrical energy exchanged between at least two electrical sources. The converter includes at least one electrical voltage source, one current source and at least one electrical switching stage, each switching stage having at least two static switches (k1) star-connected to the voltage source or voltage sources, with the common point of the star connected to the current source, and the current source being connected back to the voltage source or sources. At least one of the static switches (k1) of at least one switching stage is a switch provided with two output electrodes, of which at least one change of state (providing switching at the opening or at the closing) is automatic and is operated exclusively at a predefined voltage threshold other than zero when the absolute value of the voltage increases.

16 Claims, 14 Drawing Sheets

STATIC ELECTRIC POWER CONVERTER FOR MODULATING ELECTRIC POWER EXCHANGED BETWEEN AT LEAST A VOLTAGE SOURCE AND A CURRENT SOURCE

BACKGROUND OF THE INVENTION

The invention concerns a static electrical energy converter intended to modulate the electrical energy exchanged between at least two electrical sources, comprising at least one electrical voltage source, one current source and at least one electrical switching stage, each switching stage having at least two static switches star-connected to the voltage source or voltage sources, with the common point of the star connected to the current source, and said current source being connected back to the voltage source or sources.

The electrical switching stages depend on the presence of at least two switches intended to modulate the electrical energy exchanged between at least two electrical sources. These switches are in an electrically "open" or "closed" state and the modulation consists in alternately opening and closing these switches for variable periods.

DESCRIPTION OF THE RELATED ART

At the present time, the changes of state, or switching operations, of a switch are caused:
  either by the environment of the switch (by means of the surrounding electrical sources). This is then called spontaneous switching of the switch and the latter does not possess any control electrode able to cause switching. Example: the diode,
  or by the action of an electrode of the component provided for this purpose. Example: the firing of a thyristor by means of its gate. This is then called controlled switching of the switch.

Moreover, the relationships between the switching mechanisms of the switches in a stage results from the laws of the nodes and the links relative to this same stage, and the lossy nature of the switches. Thus;
  a controlled switching of one switch involves a spontaneous switching of another switch,
  a spontaneous switching of one switch involves a spontaneous switching of another switch.

Consequently, the switches of present-day static converters offer a limited number of possible switching mechanisms and the designers are thus forced to resort to multiple combinations of electrical switching stages and to management of the more or less complex controlled switching operations using sensors.

Furthermore, the electrical switching stages also require protective arrangements which, at the present time, consist of specific functions in a "standby" state, which may be composed of either additional components or components integrated within the actual conventional switches dedicated to the switching. By way of an example, the patent U.S. Pat. No. 4,617,508 describes one such type of stage which enables a switch to be controlled and incorporates a protective arrangement.

Consequently, while the operating point of the stage is inside the safety zone, these protective arrangements do not participate in the switching mechanism and are really "transparent". They are therefore composed of specific elements added to the switches dedicated to the switching and which result in an increase in the complexity and cost of the electric power conversion circuits.

Another drawback lies in the fact that present-day static converters are not able to use superconductive materials, photoconductors, due to the fact that these materials are unable to have spontaneous transitions. So currently, only semiconductor materials can be used for the realisation of static converters.

SUMMARY OF THE INVENTION

The present invention aims to remedy these drawbacks and its main object is to provide a third type of switching in the electrical switching stages, which leads to the appearance of supplementary switching mechanisms with respect to those of present-day stages.

Another object of the invention is to provide static electrical energy converters with automatic protection without the support of a sensor or external and specific control.

Another object of the invention is to enable switches to be realised in complete safety, which do not use the properties of semiconductors, such as superconductors, photoconductors (diamond . . . ) for example.

To this end, the invention is directed at a static electrical energy converter such as described in the above preamble, wherein at least one of the static switches of at least one switching stage, called switch with automatic switching, is a switch provided with two output electrodes, of which at least one change of state (providing switching at the opening or at the closing) is automatic and is operated exclusively at a predefined voltage threshold other than zero when the absolute value of said voltage increases.

It should be emphasised that the exclusiveness as claimed by the invention is in contrast to conventional protection systems in which a switching sequence (turning off or turning on) is operated in redundancy with an automatic switching operation (turning off or turning on). In fact in this conventional case the first cause of switching (turning off or turning on) which appears, effectively triggers said switching and renders the second inoperative: this corresponds to the conventional, integrated protection mechanism.

A change of state resulting from the third type of switching as claimed by the invention, that is automatic switching, therefore consists in:
  an automatic turn-off by an excessive voltage drop at the terminals of the switch in the conducting state,
  an automatic turn-on by an excessive voltage at the terminals of the switch in the cut-off state.

The invention therefore consists in creating a third type of switching, other than controlled and spontaneous switching operations, which consists in automatically controlled switching which is operated at a predefined voltage threshold, other than zero, positive or negative, by moving away from the zero threshold, and located within the electro-thermal safety zone of the switch.

Furthermore, this switching, that is automatic switching, is applied to at least one switch, on closing and/or on opening, and in an exclusive manner with respect to this switching.

Thanks to the introduction of this automatic switching in an electrical switching stage, the invention results in new switching combinations that are additional to those relating to the spontaneous and controlled commands:
  a controlled switching operation combined with an automatic switching operation: automatic turn-on and controlled turn-off or controlled turn-on and automatic turn-off, or a spontaneous switching operation combined with an automatic switching operation: automatic turn-on and spontaneous turn-off or spontaneous turn-on and automatic turn-off.

or an automatic switching operation combined with an automatic switching operation.

The novelty of the invention has therefore consisted in the updating of new switching mechanisms for switches, that is with automatic switching, which may be combined together, or with conventional switches with spontaneous or controlled switching to form new basic switching stages. Such stages used on their own or in combination can thus form the core of new static electrical energy converters characterised by new functionalities and by a new level of reliability.

Thus, for example, such stages produce—in the stage itself or even in specific but nevertheless basic combinations of stages—new conversion functions such as the uncontrolled, reverse current rectifier, the controlled, reverse current, reverse voltage rectifier, direct current or DC voltage connection, uncontrolled and reversible, equipped with HF electrical isolation, the PWM dimmer. It should be noted that at the present time such functions do not occur naturally in the form of the basic stage and that designers are forced to resort to multiple combinations of stages and controls using sensors.

Furthermore, every electrical switching stage subject to at least one automatic switching operation is characterised by a voltage and a current located within the safety zone of the switches comprising this stage. Every static converter using such stages is thus intrinsically self-protected without the support of a sensor or specific external control.

All these facts mean that the technical effects of the invention show themselves in terms of operational safety and simplification of the static electrical energy converters. The economic effects are to be found in better availability of equipment and cheaper static converters.

Moreover, the introduction of the automatic conversion enables switches with automatic switching to be combined with switches with controlled switching, of identical types of materials such as superconductors, photoconductors, with a view to the realisation of static conversion circuits.

According to an advantageous embodiment, the static converter as claimed by the invention has, for each switch with automatic switching, with a view to providing each of the automatic changes of state of said switch:
- a differential voltage detector connected in parallel to the output electrodes of said switch and designed to deliver a signal representing the absolute value of the voltage at the terminals of said electrodes,
- a voltage comparator connected to the voltage detector and designed to deliver a change-of-state signal, at the opening or at the closing, when the predefined voltage threshold is reached,
- and switching means connected to the voltage comparator and designed to bring about a change of state in the switch, providing switching at the opening or at the closing on reception of the change-of-state signal.

Thus, the automatic switching requires only a voltage detector placed at the terminals of the switch with automatic switching. This switch does not therefore have any current measuring electrode or sensor placed in series and able to be used for automatic switching.

Furthermore, in an advantageous manner, the switching means comprise an electronic flip-flop having, for each automatic change of state of a switch with automatic switching, an input connected to the voltage comparator so as to be activated during the reception of a change-of-state signal delivered by the latter, and to initiate the transmission of a switching signal to the switch with automatic switching.

Moreover, each switch with automatic switching has, advantageously, at least one transistor equipped with a control electrode activated by the switching means.

Based on this, and according to the examined conversion functions, each switch with automatic control may thus contain, in an advantageous manner, just one transistor, a junction connected in parallel to each transistor, said junction being able to have a diode function or a thyristor function, or two transistors each connected to a junction and mounted head to tail in series.

According to a first advantageous application, the static converter as claimed by the invention comprises at least one switch with automatic switching, whose change of state, providing closing or opening, is automatic and whose other change of state, providing opening or closing, is controlled.

Moreover, according to this application, and in an advantageous manner, this static converter comprises, with a view to the controlled change of state of each switch with automatic switching:
- a control line on which is supplied a signal composed of cyclic control pulses for the controlled change of state of the switch,
- a shunt line having an inverter and connected to the control line and to one of the inputs of an "AND" logic gate whose other input receives the signal coming from the voltage comparator, and whose output is connected to the switching means.

By way of advantageous embodiments, according to this application the following may be mentioned for example:
- a chopper type static converter comprising an electrical switching stage having a switch with automatic control composed of a transistor and whose automatic change of state provides opening, and whose controlled change of state provides closing, and a second switch having a diode function,
- a chopper type static converter comprising an electrical switching stage having a switch with automatic control composed of a transistor and whose automatic change of state provides closing, and whose controlled change of state provides opening, and a second switch having a diode function,
- a PWM dimmer type static converter comprising an electrical switching stage having two switches with automatic switching each equipped with two transistors in parallel, each with a junction providing the opening and closing changes of state, respectively,
- a rectifier bridge type static converter comprising two electrical switching stages arranged either side of an alternating voltage source and each having two switches with automatic control providing, for each of said stages, the changes of state at opening and closing, respectively, each of said switches being composed of a transistor and an array of junctions in parallel having a thyristor function.

According to a second advantageous application, the static converter as claimed by the invention comprises at least one switch with automatic control, whose two changes of state providing closing and opening are automatic.

By way of advantageous examples according to this second application the following may be mentioned: static converters consisting of choppers connected to their filter or to inductive or capacitive storage elements, either without storage (or booster), with inductive or capacitive storage, or even consisting of dimmers.

According to a third advantageous application, the static converter as claimed by the invention comprises at least one switch with automatic switching, whose change of state providing closing or opening is automatic, and whose other change of state providing opening or closing is spontaneous.

Moreover, according to this application, and in an advantageous manner, with a view to the spontaneous change of state providing closing switching, this static converter comprises a change-of-state line having an inverter and connecting the voltage comparator and the switching means.

By way of advantageous examples according to this third application the following may be mentioned: converter type or rectifier type static converters.

BRIEF DESCRIPTION OF THE DRAWINGS

Other features, objects and advantages of the invention will emerge in the detailed description which follows, with reference to the attached drawings which show by way of non-restrictive examples six embodiments of the switching mechanism of a switch with automatic switching as claimed by the invention, as well as for each of said embodiments examples of static converters using the switching mechanism under consideration. Of these drawings:

DESCRIPTION OF THE PREFERRED EMBODIMENTS

Figure 1:
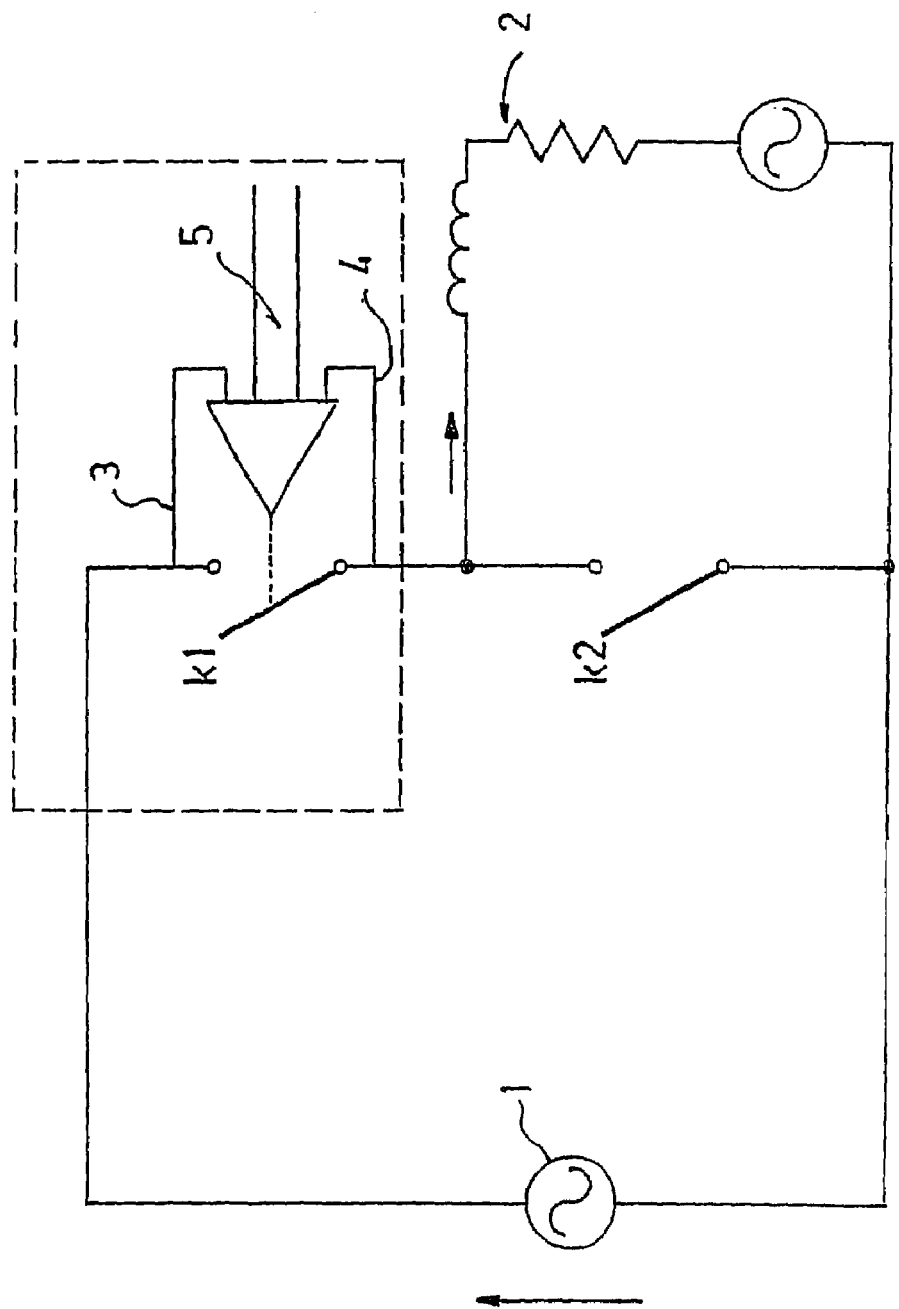
FIG. 1 is a block diagram of a basic switching stage as claimed by the invention.

The basic conversion stage shown in FIG. 1 comprises, in a conventional manner, an electrical voltage source 1, a current source 2, and two static switches with switching K1, K2, star-connected to the voltage source 1, with the common point of the star connected to the current source 2.

As claimed by the invention, at least one of the static switches in the example K1 is a switch equipped with two output electrodes 3, 4, of which at least one of the changes of state is automatic and is operated exclusively at a predefined threshold, other than zero, when the absolute value of said voltage rises.

Furthermore, this switch K1 is connected to a switching mechanism 5 capable of allowing five different switching modes of said switch to be controlled, that is to say:

controlled closing—automatic opening,
spontaneous closing—automatic opening
automatic closing—controlled opening
automatic closing—spontaneous opening
automatic closing—automatic opening The other switch K2, may, as described below, consist of a switch with controlled, spontaneous or automatic switching.

Figure 2:
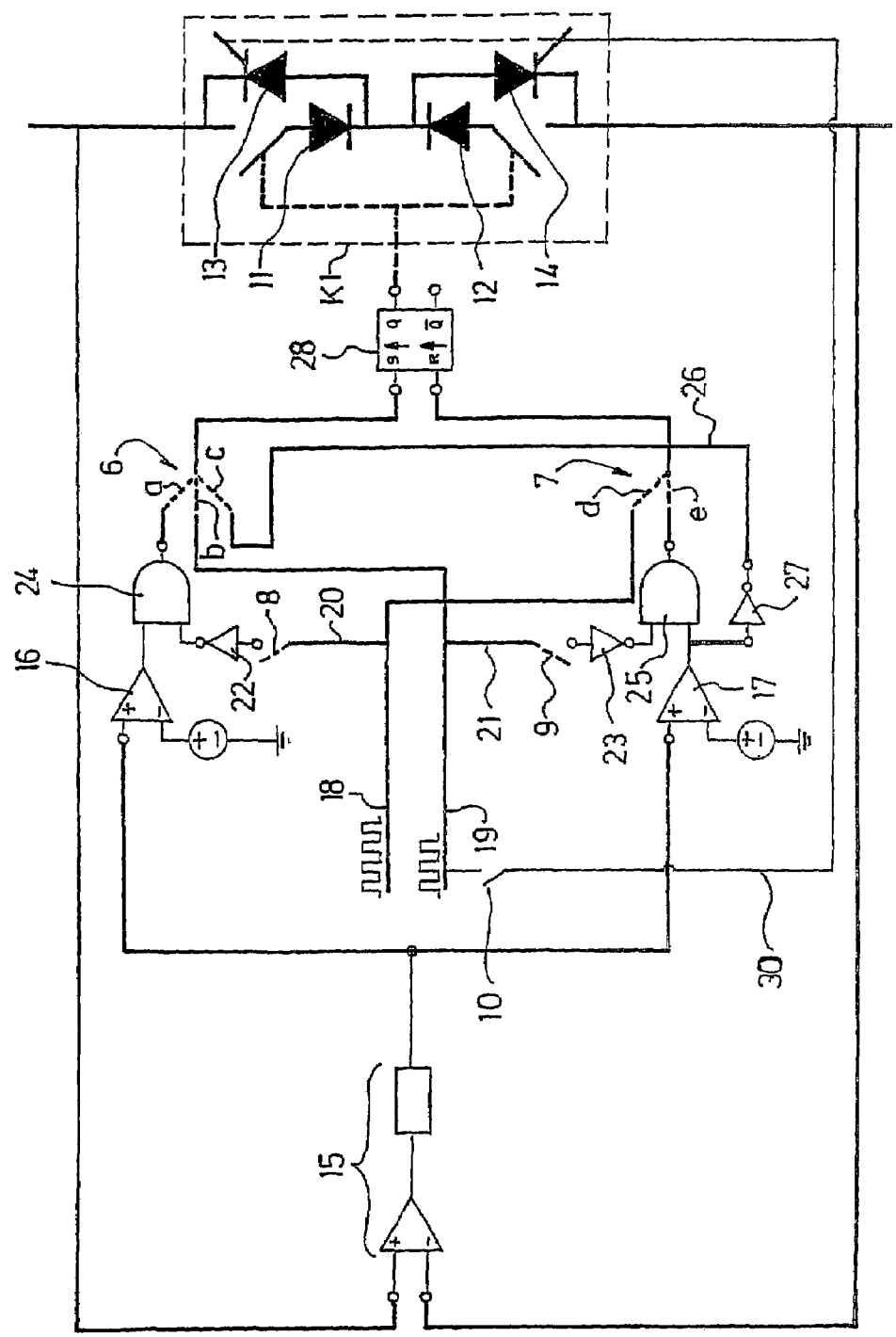
FIG. 2 is a diagram of an electronic circuit capable of providing the different switching mechanisms of a generic switch with automatic control as claimed by the invention.

FIG. 2 shows a general electronic circuit diagram of a switching mechanism enabling one of the above-mentioned switching modes of the switch K1 to be selected at will by means of selectors 6 to 10, K1 itself being made up of a generic switch capable of accepting each of these configuration modes.

To this end, and firstly, the switch K1 is composed of two transistors 11 and 12 mounted head to tail in series, and in parallel with each of these transistors 11, 12 a junction 13, 14 able to have either a diode function or a thyristor function.

Made up in this manner, this switch K1 appears in the form of a switch subdivided into two secondary switches 11–13 and 12–14 which, on the one hand, allow to each one voltage reversibility, and on the other hand, for the first 11–13 the passage of a positive or negative current, and for the second 12–14 the passage of a negative or positive current.

The switching mechanism has, firstly, means for measuring the voltage at the terminals of the switch K1, made up of a differential voltage measuring sensor 15, able to deliver a signal the magnitude of which is an image of the absolute value of the voltage at the terminals of K1.

This measuring sensor 15 is connected to one of the inputs of two voltage comparators 16, 17 designed to deliver a change-of-state signal at opening and closing, respectively, for two predefined, respective opening and closing voltage thresholds.

Thus, the automatic closing threshold triggering the output of a change-of-state signal by the comparator 16 is a high threshold, for example 1000 V (absolute value).

The automatic opening threshold triggering the output of a change-of-state signal by the comparator 17 is a low threshold, for example 8 V (absolute value), which also constitutes a spontaneous closing threshold.

With a view to producing a controlled change of state at the closing or opening of the switch K1, this switching mechanism furthermore comprises two control lines 18, 19, on which are delivered signals composed of cyclical control pulses for the controlled opening and the controlled closing, respectively, of the switch K1.

Furthermore, with a view to these controlled changes of state, two shunt lines 20, 21, each having an inverter 22, 23, are each connected to one of the control lines 18, 19, and to one input of an "AND" logic gate 24, 25, whose other input receives the signal coming from one of the comparators 16, 17. These shunt lines 20, 21 thus cancel any conflict between controlled switching by the external electrode and automatic switching.

Each of the control lines 18, 19 is connected to the respective output of one of the logic gates 24, 25.

In addition, this switching mechanism also enables a controlled closing of the switch K1 to be obtained. To this end, this switching mechanism includes an auxiliary control line 30, on which is interposed a selector 10, and connecting the control line 19 to the gates of the thyristors 13, 14 of the switch K1.

Furthermore, with a view to producing a spontaneous closing of the switch K1, a spontaneous closing line 26 including an inverter 27, is connected to the output of the comparator 17 associated with the automatic opening threshold, and to the output of the logic gate 24 associated with the other comparator 16.

As mentioned above, the choice of switching mode is determined by the selection of the selector position:
a selector 6 with three positions (a), (b), (c) for the choice of closing switching, of which, as shown in FIG. 2:
  the position (a) determines the choice of an automatic closing,
  the position (b) determines the choice of a controlled closing and produces the closing of a synchronised selector 9, located on the shunt line 21 connected to the closing control line 19,
  the position (c) determines the choice of a spontaneous closing,
a selector 7 with two positions (d), (e) for the choice of the opening switching mode, of which, as shown in FIG. 2:
  the position (d) determines the choice of a controlled opening and produces the closing of a synchronised selector 8 located on the shunt line 20 connected to the opening control line 18,
  the position (e) determines the choice of an automatic closing,
a selector 10 open or closed, whose closed position determines the choice of a controlled closing.

Lastly, the closing control signal, which is a function of the position of the selector 6, is delivered to the "set" input of an electronic flip-flop 28, whose output Q is connected to the control electrodes of the transistors 11, 12 of the switch K1.

The opening control signal, which is a function of the position of the selector 7, is delivered to the "reset" input of the electronic flip-flop.

Such a switching mechanism thus enables several switching modes of the switch K1 to be selected at will according to the chosen position of the selectors 6, 7 and 10:
  controlled closing—automatic opening: positions (b) and (e) of the selectors 6, 7, respectively, or position (e) of the selector 6 and closed position of the selector 10,
  spontaneous closing—automatic opening: positions (c) and (e), respectively, of the selectors 6, 7,
  automatic closing—controlled opening: positions (a), (d), respectively, of the selectors 6, 7,
  automatic closing—automatic opening: positions (a), (e), respectively, of the selectors 6, 7,
  automatic closing—spontaneous opening: position (a) of the selector 6 and spontaneous opening realised by the series junctions of the switch K1.

Several application examples corresponding to various switching modes of the switch K1 mentioned above are described below.

Figure 3A:
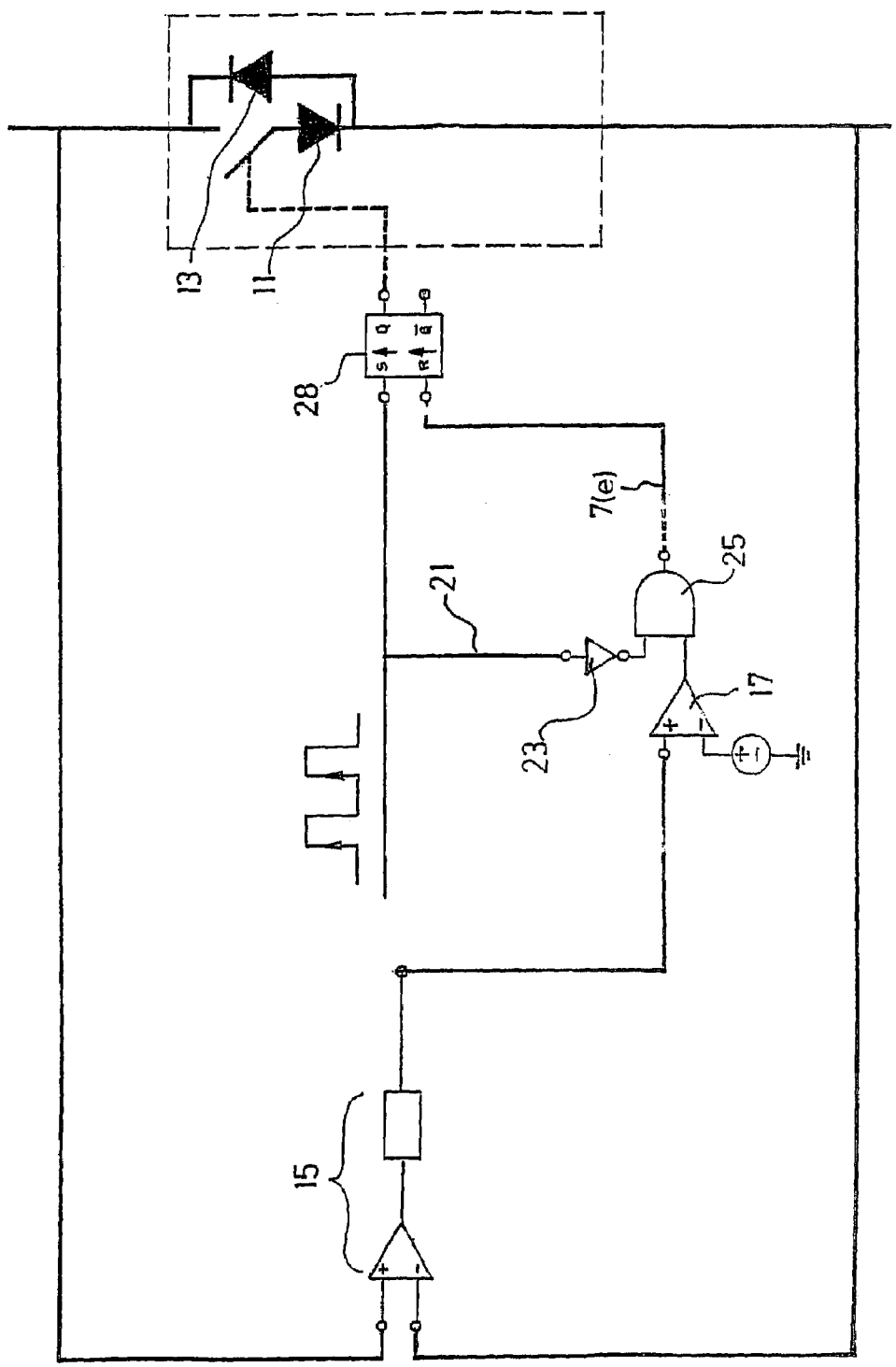
FIG. 3a is an electronic circuit diagram of a control mechanism of a switch with controlled closing and automatic opening.

Firstly, FIG. 3*a* shows the switching mechanism of FIG. 2 configured so as to determine the controlled closing—automatic opening switching mode (positions (b) and (e) of the selectors 6, 7).

According to this configuration, between two pulses on the controlled closing line 19, the input of the logic gate 25 to which the shunt line 21 is connected, is at high logic level due to the presence of the inverter 23. Consequently, when the voltage at the terminals of the switch K1 exceeds the automatic opening threshold, the "reset" input of the flip-flop 28 is activated, producing the automatic opening of each transistor of the switch K1.

By contrast, when there is a pulse on the control line 19, the automatic opening is disabled due to the fact that the input of the logic gate 25, to which the shunt line 21 is connected, is driven to a low logic level and the "set" input of the flip-flop 28 is activated, producing the closing of each transistor of the switch K1.

Figure 3B:
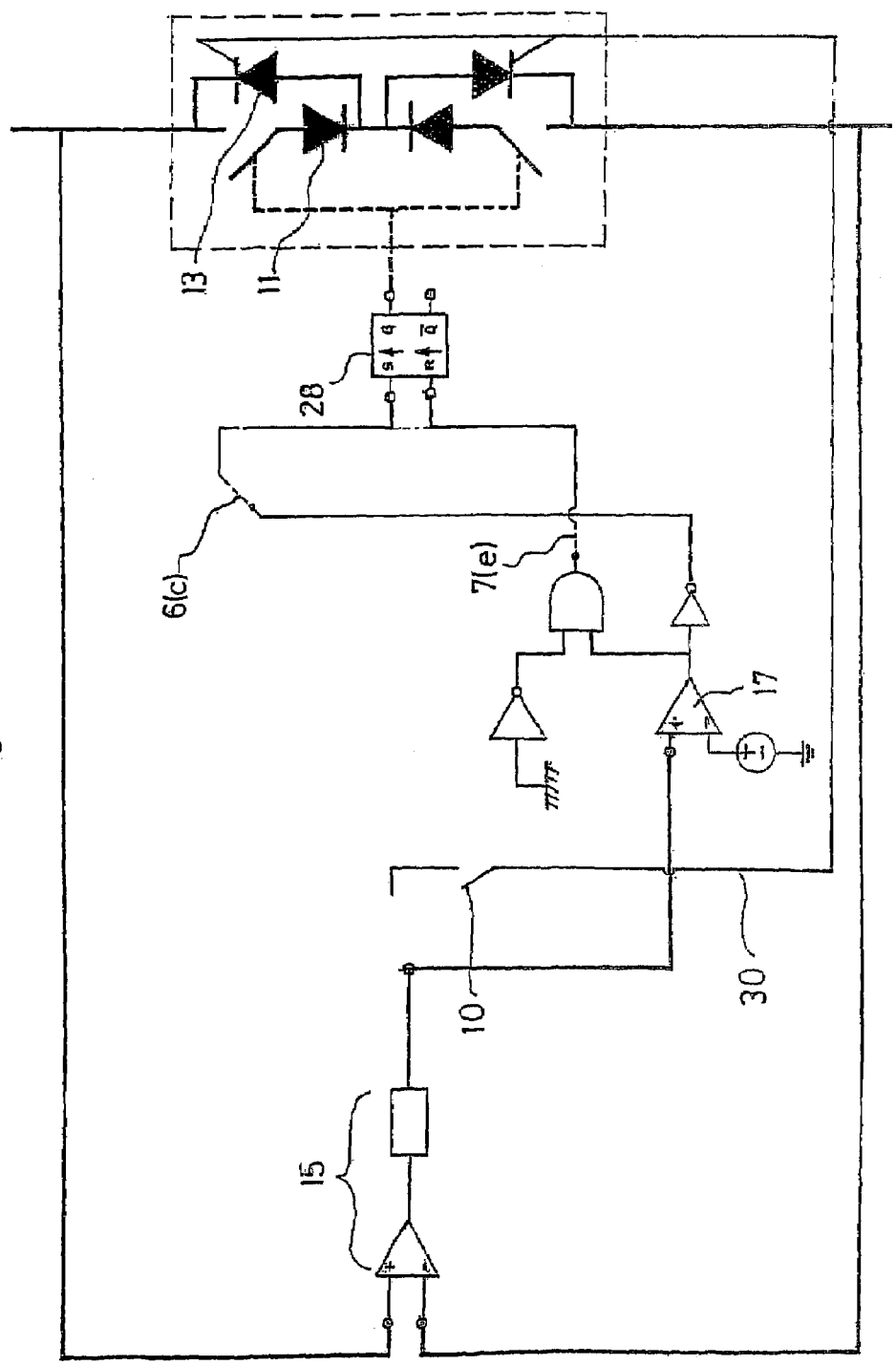
FIG. 3b is an electronic circuit diagram of a variant of the control mechanism of a switch with controlled closing and with automatic opening.

FIG. 3*b* shows a variant, which also enables the controlled switching mode to be obtained (closed position of the selector 10 and position c of the selector 6)—automatic opening (position e of the selector 7).

According to this configuration, the thyristors 13, 14 of the switch K1 are controlled to closing during the closing of the selector 10, in correlation with the position c of the selector 6, which validates the spontaneous closing by cancelling the voltage at the terminals of the transistors 11, 12.

Figure 4:
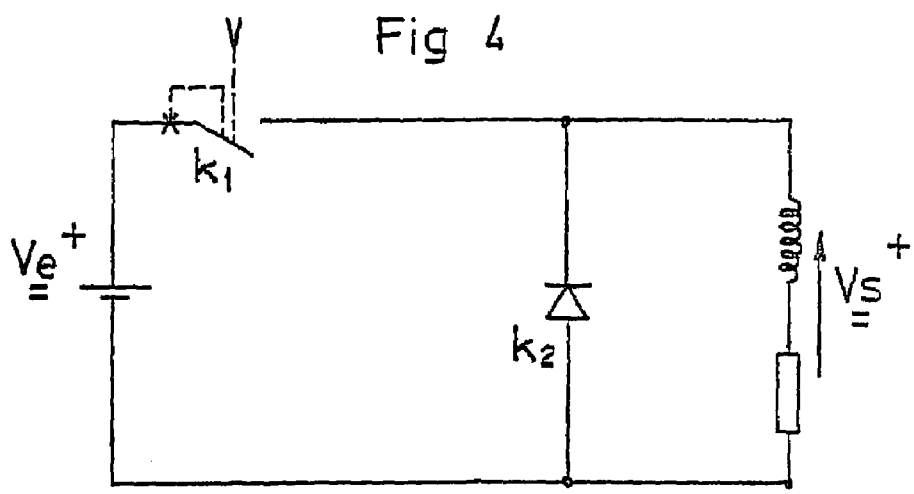
FIGS. 4 to 9 show six examples of static converters having at least one switch with automatic control operating according to the switching mode shown in FIG. 3.
Figure 5:
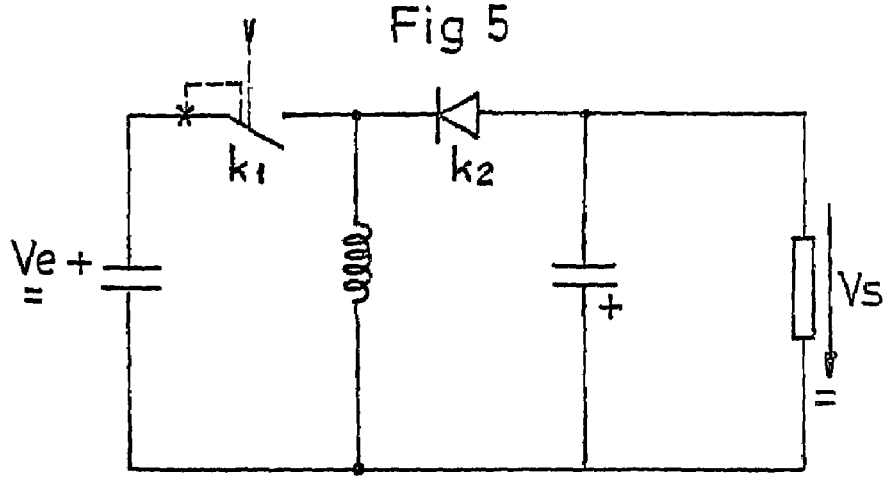
Figure 6:
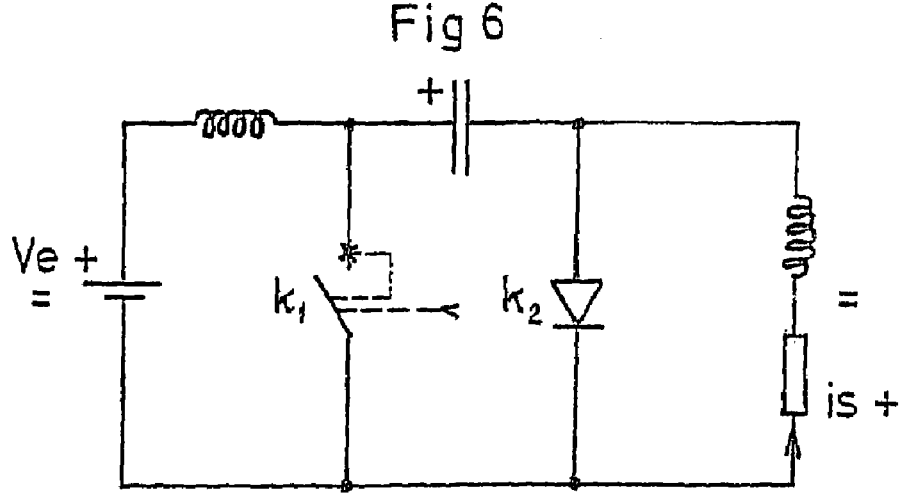

By way of embodiments according to these configuration modes, and firstly, FIGS. 4, 5 and 6 show three types of choppers comprising a single switching stage having a switch K1 composed of a transistor 11 and a switch K2 formed by a diode:
  a chopper without storage or booster, denoted a "BUCK" (FIG. 4),
  a chopper with inductive storage denoted a "BUCK-BOOST" (FIG. 5,
  and a chopper with capacitive storage denoted a "CUK" (FIG. 6).

Figure 7:
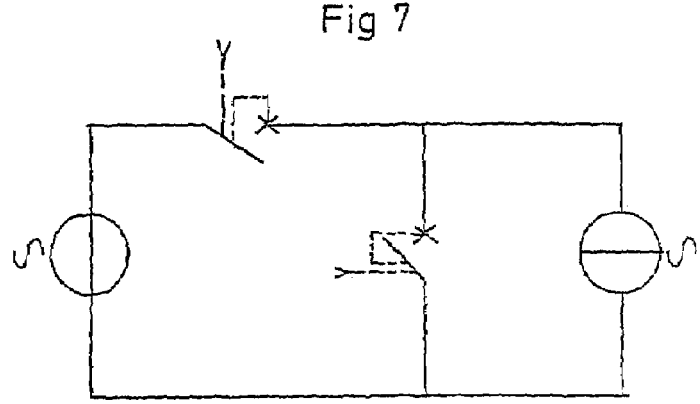

FIG. 7 shows another example consisting of a dimmer stage with controlled circuit-breakers having two switches K1 and K2, each formed by two transistors 11, 12 mounted head to tail in series, and by two diode junctions 13, 14, each in parallel with one of the transistors.

Figure 8:
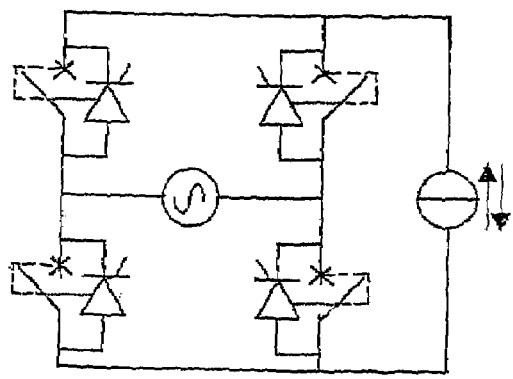

FIG. 8 shows another example formed by the combination of two basic stages and consisting of a rectifier bridge, fully current and voltage-reversible, with "controllable" circuit-breakers. Each of the basic stages has two identical switches, each composed of one transistor 11 mounted in parallel with a thyristor junction 13.

Figure 9:
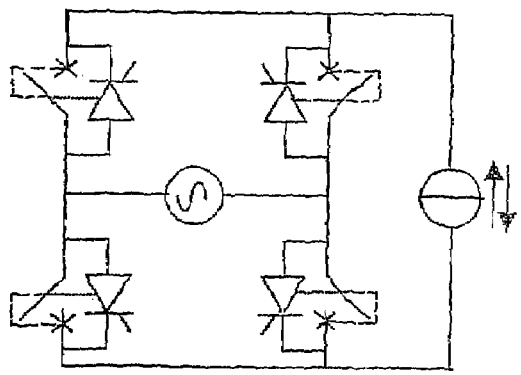

FIG. 9 shows a rectifier bridge, mixed current and voltage-reversible, with controllable circuit-breakers and unit "cos ϕ" . This rectifier is identical to that described with reference to FIG. 8, save for the 180° inversion of one of the unit stages, which gives it a different functionality.

Figure 10:
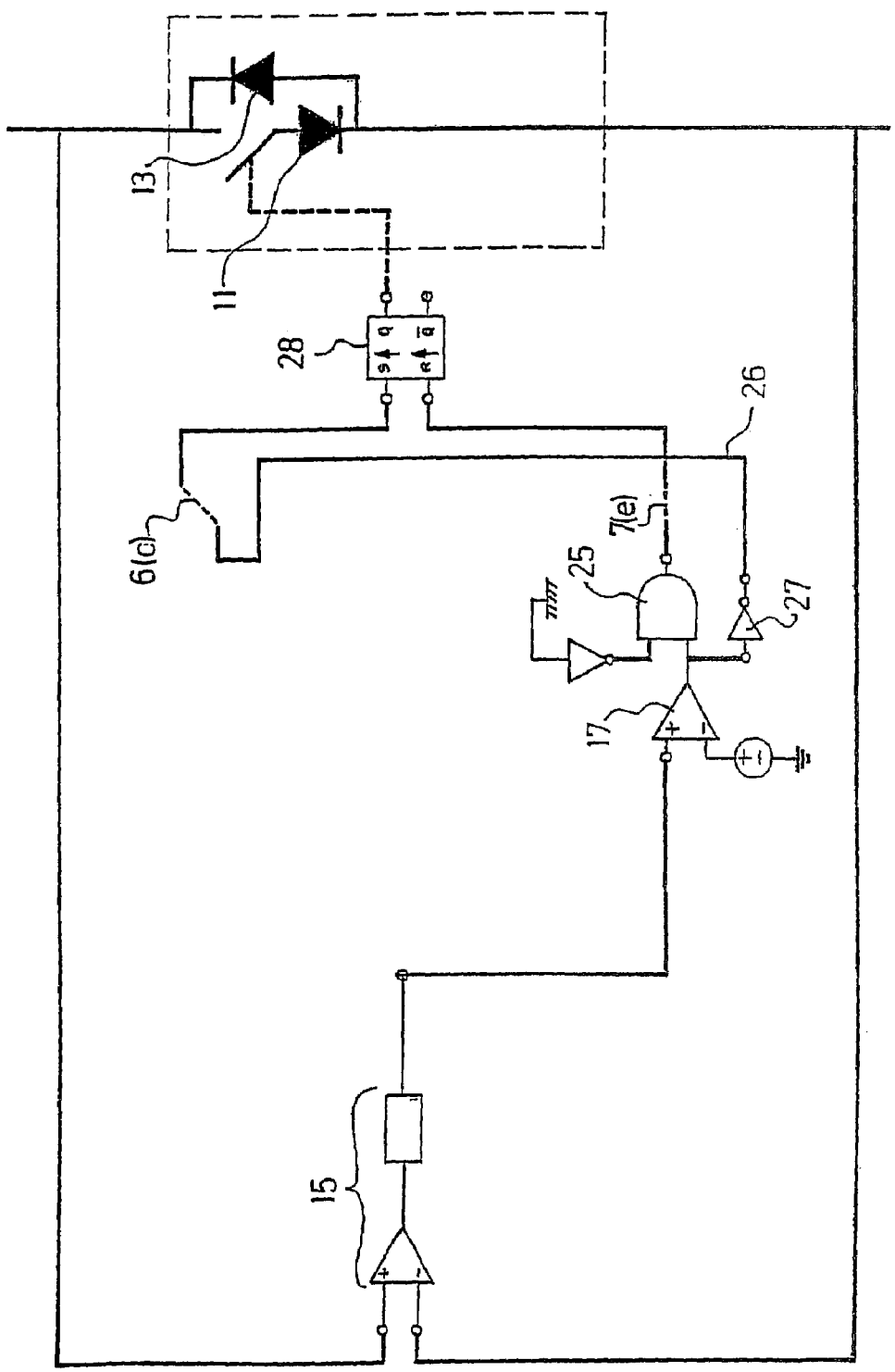
FIG. 10 is an electronic circuit diagram of a control mechanism of a switch with spontaneous closing and automatic opening.

FIG. 10 shows the switching mechanism of FIG. 2, configured so as to determine the spontaneous closing—automatic opening switching mode (positions (c) and (e) of the selectors 6, 7).

According to this configuration, the automatic opening is triggered when the voltage at the terminals of the switch K1 exceeds the automatic opening threshold, due to the activation of the "reset" threshold of the flip-flop 28.

In contrast, when the voltage at the terminals of the switch K1 is less than the automatic opening threshold, the "set" input of the flip-flop 28 is activated by the spontaneous closing line 26, due to the presence of an inverter 27, and spontaneous closing of the switch K1 is obtained.

Figure 11:
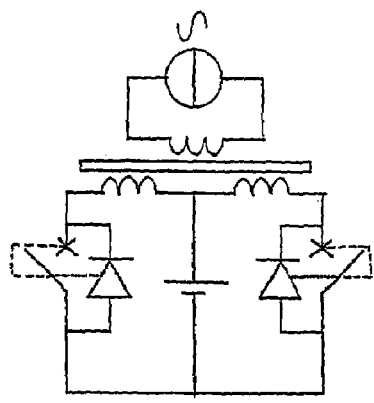
FIGS. 11 to 14 show four examples of static converters having at least one switch with automatic control operating according to the switching mode shown in FIG. 10.
Figure 12:
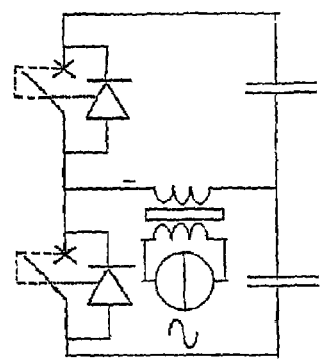

By way of embodiments according to this configuration mode, and firstly, FIGS. 11, 12 show two types of half-bridge, so-called "push-pull" rectifiers with "spontaneously triggered" circuit-breaker, comprising a basic stage having two identical switches K1, K2 composed of a transistor 11 and a diode junction in parallel:

a parallel half-bridge/"push bull" (FIG. 11),
a series half-bridge/"push bull" (FIG. 12).

Figure 13:
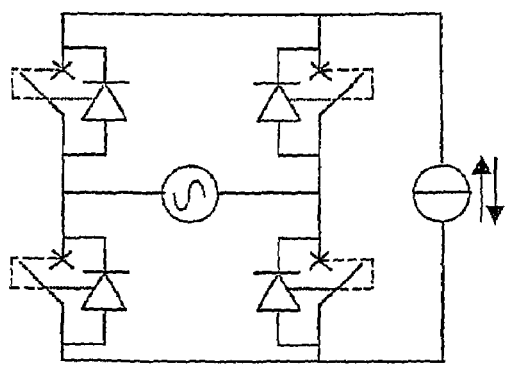

FIG. 13 shows an uncontrolled reversible rectifier bridge with a self-triggered circuit-breaker composed of the combination of two basic stages each having two identical switches K1, K2 equipped with a transistor 11 and a diode junction 13 in parallel.

Figure 14:
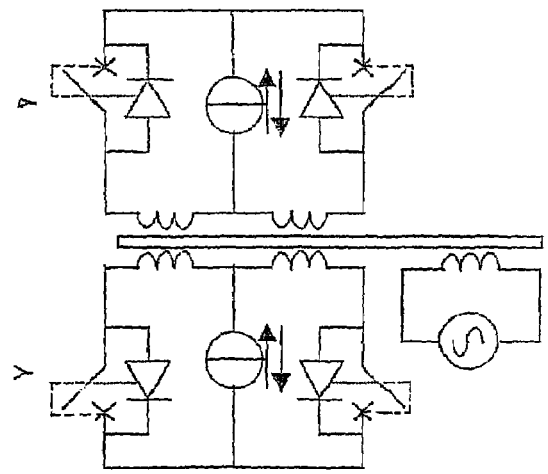

FIG. 14 shows a reversible, uncontrolled and isolated direct current link with a self-triggered circuit-breaker composed of the combination of two basic stages each having two identical switches K1, K2 similar to those of FIG. 13.

Figure 15:
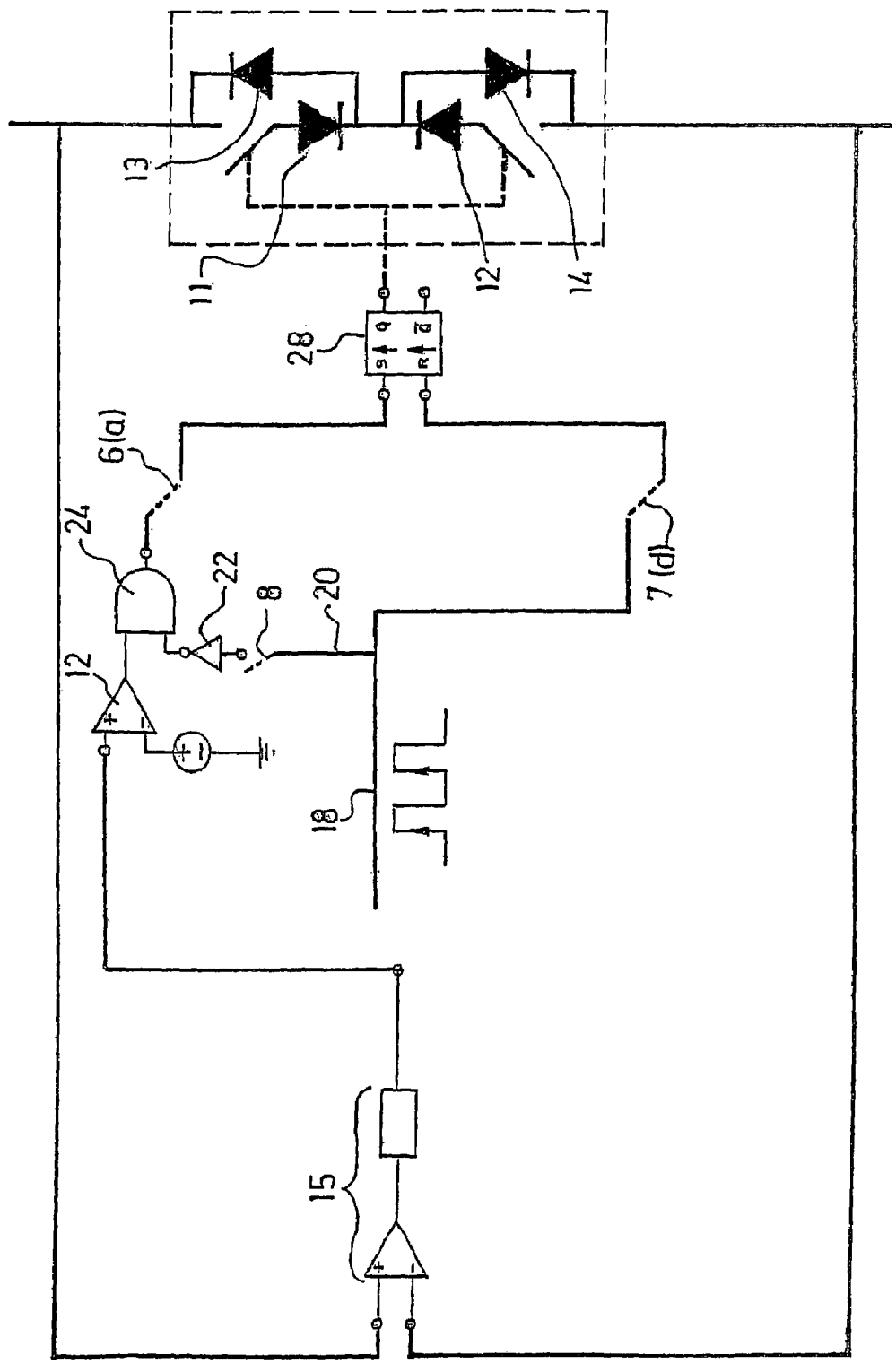
FIG. 15 is an electronic circuit diagram of a control mechanism of a switch with automatic closing and with controlled opening.

FIG. 15 shows the switching mechanism of FIG. 2, configured so as to determine the automatic closing—controlled opening configuration mode (positions (a), (d) of the selectors 6, 7).

According to this configuration, between two pulses on the control line 18, the input of the "AND" logic gate 24, to which the shunt line 20 is connected, is at a logic high level threshold due to the presence of the inverter 22. Consequently, when the voltage at the terminals of the switch K1 exceeds the automatic closing threshold, the "set" input of the flip-flop 28 is activated, producing the automatic closing of each transistor of the switch K1.

By contrast, when there is a pulse on the control line 18, the automatic closing is de-activated due to the fact that the input of the logic gate 24, to which the shunt line 20 is connected, is driven to a low logic level and the "reset" input of the flip-flop is activated, producing the controlled opening of each transistor of the switch K1.

Figure 16:
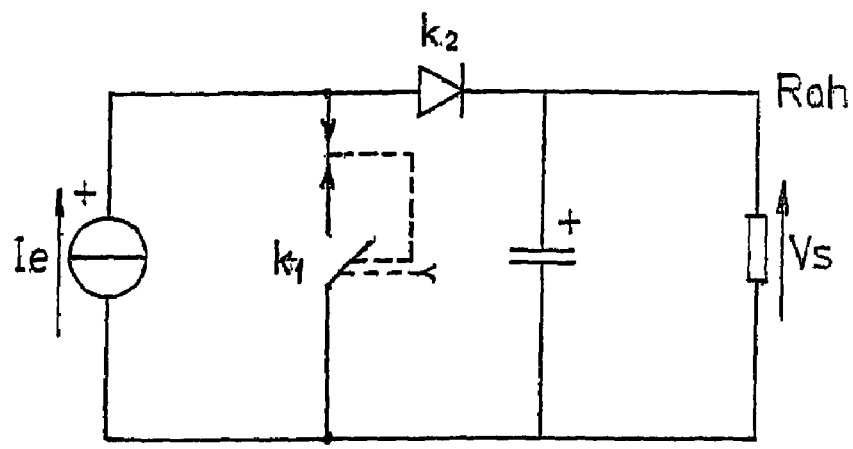
FIGS. 16 to 19 show four examples of static converters having at least one switch with automatic control operating according to the switching mode shown in FIG. 15.
Figure 17:
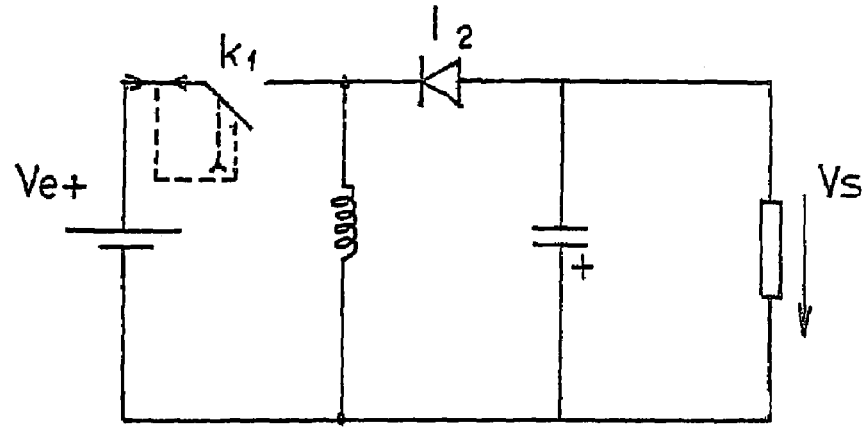
Figure 18:
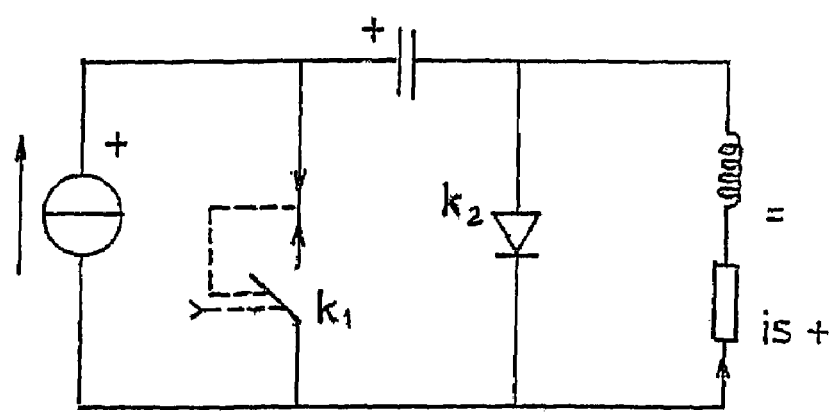

By way of embodiments according to this configuration mode, FIGS. 16, 17, 18 show three types of choppers comprising a single basic cell made up of a switch K1 composed of a transistor 11 and a switch K2 formed by a diode junction:

a boost chopper, denote "BOOST" (FIG. 16),
a chopper with inductive storage, denoted "BUCK-BOOST" (FIG. 17),
and a chopper with capacitive storage, denoted "CUK" (FIG. 18).

Figure 19:
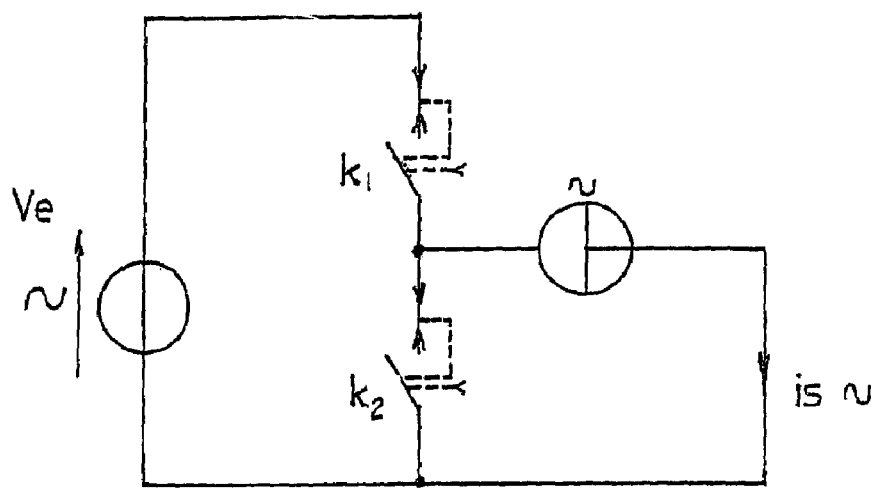

FIG. 19 shows a dimmer with controlled circuit-breakers having two identical switches K1, K2, each formed by two transistors 11, 12 mounted head to tail in series, and two diode junctions 13, 14, each in parallel with a transistor 11, 12.

Figure 20:
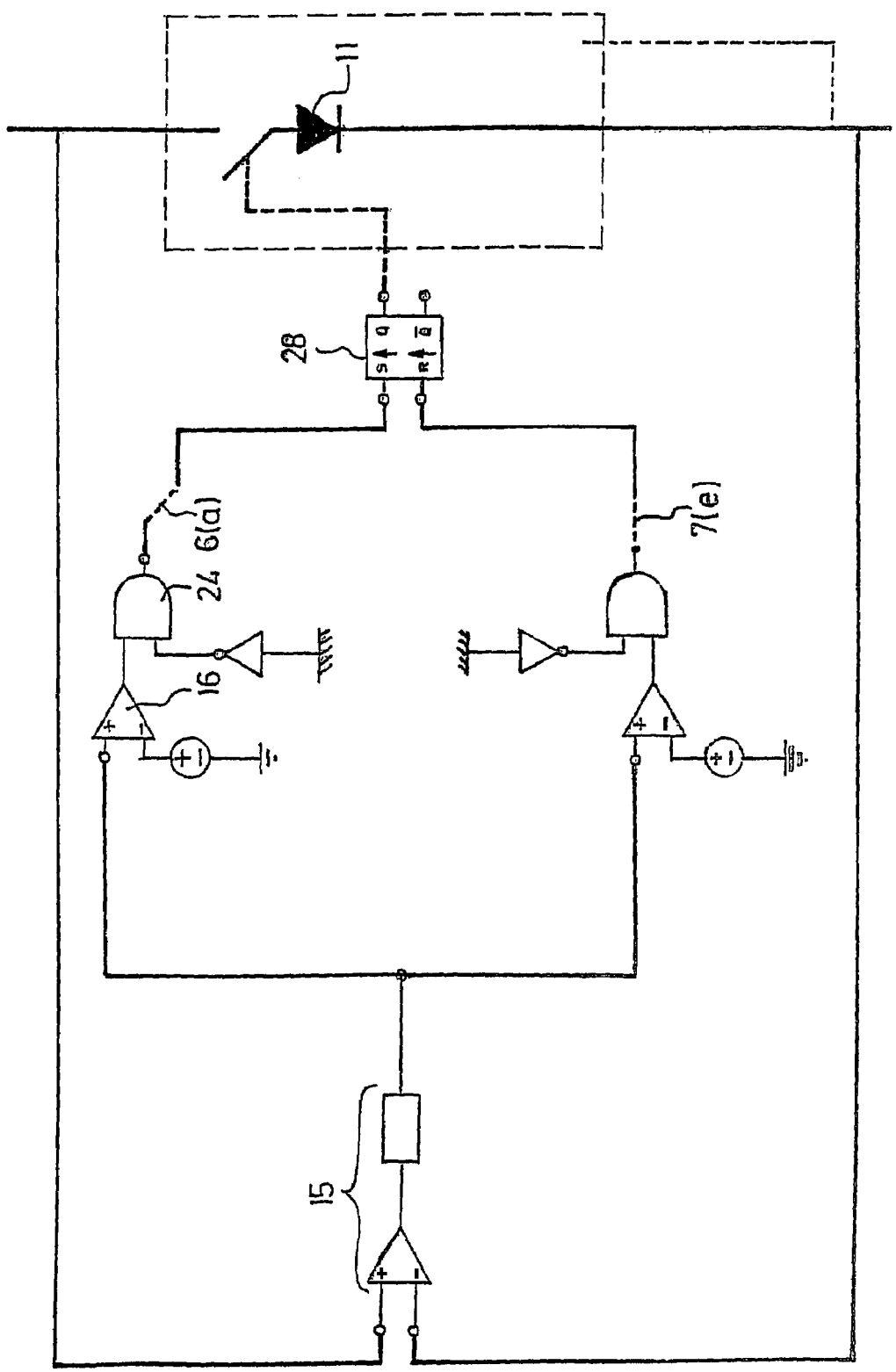
FIG. 20 is an electronic circuit diagram of a control mechanism of a switch with automatic closing and spontaneous opening.

FIG. 20 shows the switching mechanism of FIG. 2, configured so as to obtain the automatic closing—spontaneous opening switching mode (position (a) of the selector 6 and position (e) of the selector 7).

According to this configuration, the automatic closing takes place when the voltage at the terminals of the switch K1 exceeds the automatic closing threshold, due to the activation of the "set" input of the flip-flop 28.

In contrast, when the voltage at the terminals of the switch K1 is less than the automatic closing threshold, spontaneous closing is obtained by the series junctions of the switch.

As a consequence, the resetting of the flip-flop 28 occurs at the detection of the voltage rise and, in particular, of the low threshold cross-over of the absolute value by means of the comparator 17, and of the gate 25 and of the selector 7 in position (e).

Figure 21:
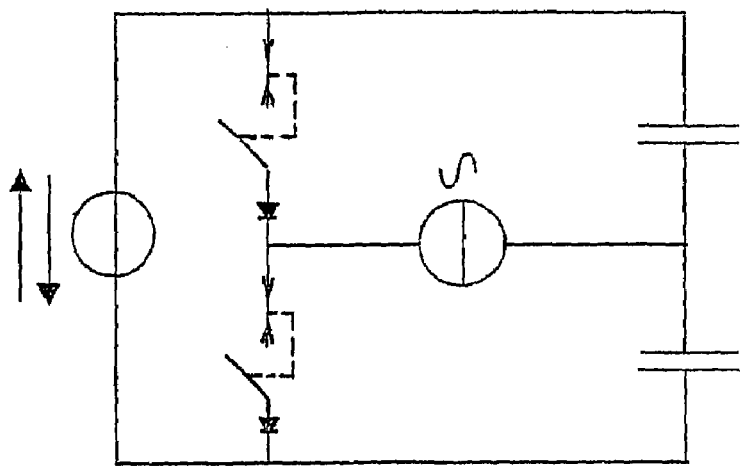
FIG. 21 shows an example of a static converter having at least one switch with automatic control operating according to the switching mode shown in FIG. 20.

By way of embodiments according to this switching mode, FIG. 21 shows a basic stage forming a dual circuit-breaker having two identical switches K1, K2, arranged in series in the same polarity, and composed of a transistor 12.

Figure 22:
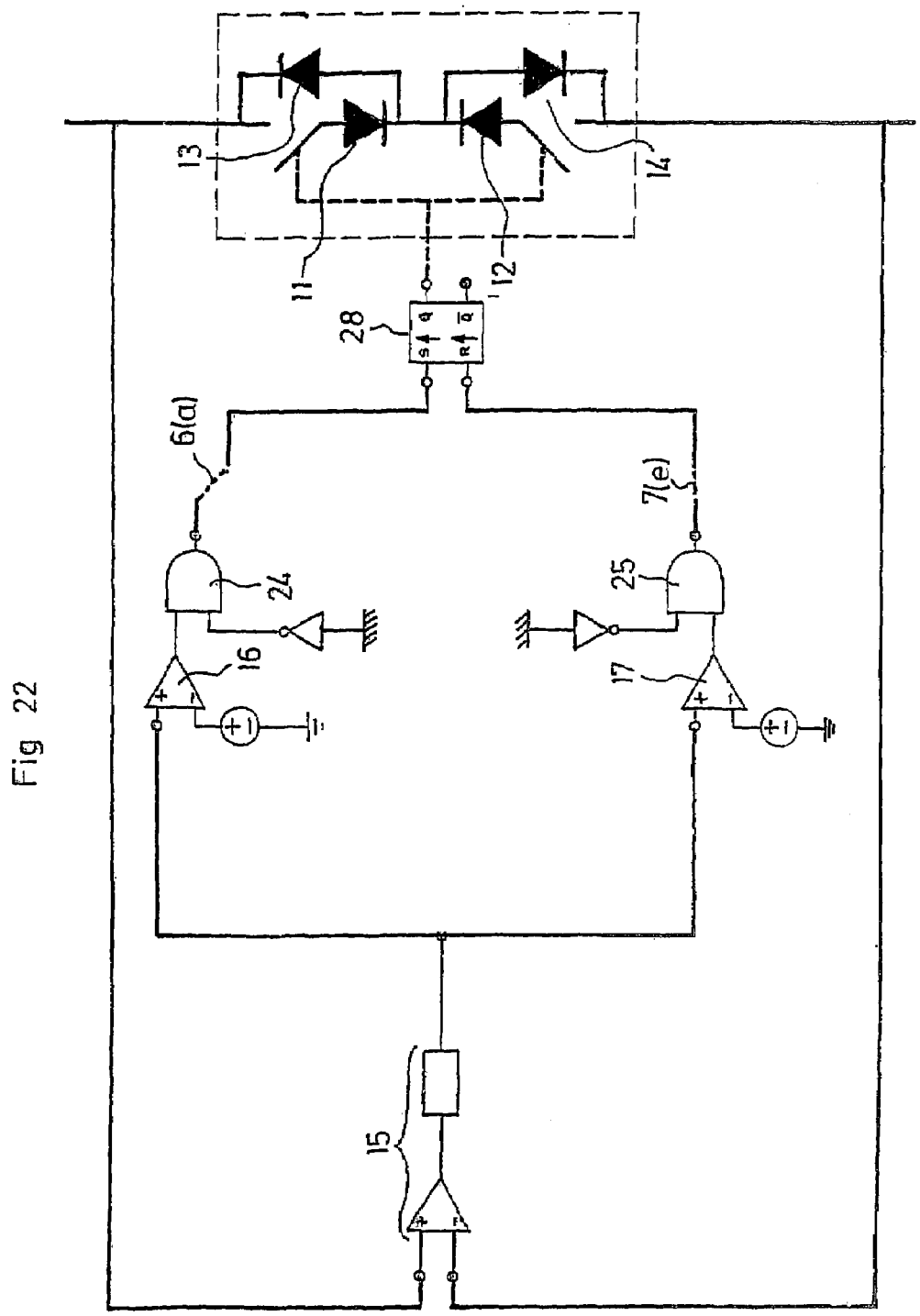
FIG. 22 is an electronic circuit diagram of a control mechanism of a switch with automatic closing and automatic opening.

Finally, FIG. 22 shows the switching mechanism of FIG. 2, configured so as to obtain an automatic closing—automatic opening switching mode (positions (a), (e) of the selectors 6, 7).

According to this configuration, the changes of state of the switch K1 occur when the voltage at the terminals of this switch exceed the closing and opening thresholds, respectively.

This configuration therefore constitutes a compilation of the controlled closing, automatic opening, automatic closing and controlled opening configurations.

Figure 23:
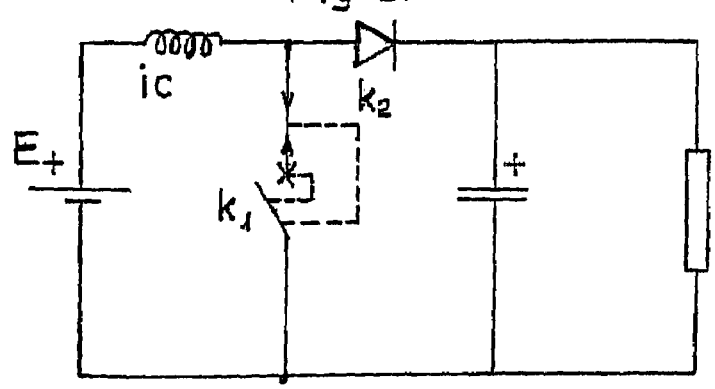
FIGS. 23 to 26 show four examples of static converters having at least one switch with automatic control operating according to the switching mode shown in FIG. 22.
Figure 24:
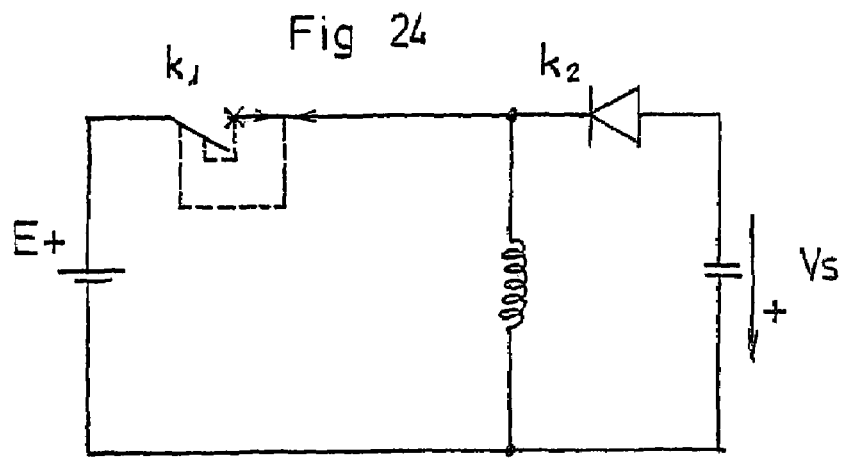
Figure 25:
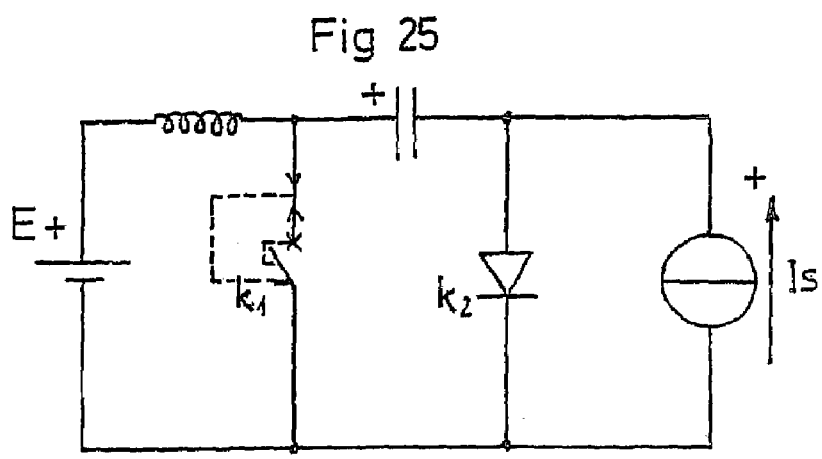

By way of examples, FIGS. 23, 24, 25 show three choppers that are similar to those of FIGS. 4 to 6 (boost, inductive storage, capacitive storage), each formed by a basic stage having a switch K1 formed by a transistor 12, and a switch K2 formed by a diode junction.

Figure 26:
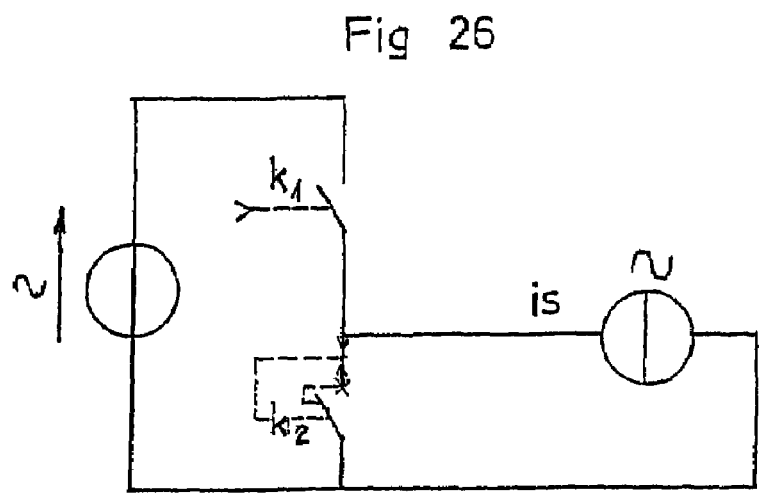

Similarly, FIG. 26 shows a dimmer with a single circuit-breaker K1 with automatic closing and opening, the other switch K2 having controlled closing and opening.

The invention claimed is:

1. A static electrical energy converter intended to modulate the electrical energy exchanged between at least two electrical sources, comprising at least one electrical voltage source (1), one current source (2), and at least one electrical switching stage, each switching stage having at least two static switches (k1, k2) star-connected to the voltage source (1), with the common point of the star connected to the current source (2), and said current source being connected back to the voltage source (1), wherein, in said static converter, at least one of the static switches (k1, k2) of at least one switching stage, called switch with automatic switching, is a switch provided with two output electrodes (3, 4) of which at least one of the changes of state (providing opening or closing switching) is automatic and is operated exclusively at a predefined voltage threshold other than zero when the absolute value of said voltage increases.

2. A static converter as claimed in claim 1, wherein, for each switch (k1, k2) with automatic switching, with a view to providing each of the automatic changes of state of said switch:

a differential voltage detector (15) connected in parallel to the output electrodes (3, 4) of said switch and designed to deliver a signal representing the absolute value of the voltage at the terminals of said electrodes, a voltage comparator (16, 17) connected to the voltage detector (15) and designed to deliver a change-of-state signal, at the opening or at the closing, when the predefined voltage threshold is reached, and switching means (5) connected to the voltage comparator (15) and designed to bring about a change of state in the switch (k1, k2), providing switching at the opening or at the closing on reception of the change-of-state signal.

3. A static converter as claimed in claim 2, wherein the switching means (5) comprise an electronic flip-flop (28) having, for each automatic change of state of a switch with automatic switching (k1, k2), an input connected to the voltage comparator (16, 17) so as to be activated during the reception of a change-of-state signal delivered by the latter, and to initiate the transmission of a switching signal to the switch with automatic switching (k1, k2).

4. A static converter as claimed in claim 2, wherein each switch with automatic switching (k1, k2) has at least one transistor function (11, 12) equipped with a control electrode activated by the switching means (5).

5. A static converter as claimed in claim 4, wherein each switch with automatic switching (k1, k2) has a junction or an array of junctions (13, 14) connected in parallel to each transistor (11, 12).

6. A static converter as claimed in claim 5, wherein the junction (13, 14) has a diode function.

7. A static converter as claimed in claim 5, wherein the junction (13, 14) has a thyristor function.

8. A static converter as claimed in claim 5, further comprising at least one switch with automatic switching (k1, k2) equipped with two transistor functions (11, 12) mounted head to tail in series.

9. A static converter as claimed in claim 1, further comprising at least one switch with automatic switching whose change of state, providing closing or opening, is automatic (k1) and whose other change of state, providing opening or closing, is controlled.

10. A static converter as claimed in claim 9, wherein, for each switch (k1, k2) with automatic switching, with a view to providing each of the automatic changes of state of said switch:
   a differential voltage detector (15) connected in parallel to the output electrodes (3, 4) of said switch and designed to deliver a signal representing the absolute value of the voltage at the terminals of said electrodes,
   a voltage comparator (16, 17) connected to the voltage detector (15) and designed to deliver a change-of-state signal, at the opening or at the closing, when the predefined voltage threshold is reached,
   and switching means (5) connected to the voltage comparator (15) and designed to bring about a change of state in the switch (k1, k2), providing switching at the opening or at the closing on reception of the change-of-state signal, and
   further comprising, with a view to the controlled change of state of each switch with automatic switching (k1):
   a control line (18, 19) on which is supplied a signal composed of cyclic control pulses for the controlled change of state of the switch,
   a shunt line (20, 21) having an inverter (8, 9) and connected to the control line (18, 19) and to one of the inputs of an "AND" logic gate (24, 25) whose other input receives the signal coming from the voltage comparator (16, 17), and whose output is connected to the switching means (28).

11. A chopper type static converter as claimed in claim 9, wherein each switch with automatic switching (k1, k2) has at least one transistor function (11, 12) equipped with a control electrode activated by the switching means (5); and
   further comprising an electrical switching stage having a switch with automatic control (k1) composed of a transistor (11) and whose automatic change of state provides opening, and whose controlled change of state provides closing, and a second switch (k2) having a diode function.

12. A dimmer type static converter as claimed in claim 9, further comprising:
   at least one switch with automatic switching (k1, k2) equipped with two transistor functions (11, 12) mounted head to tail in series; and
   an electrical switching stage having two switches with automatic switching (k1, k2) as claimed in claim 8, providing the opening and closing changes of state, respectively.

13. A rectifier bridge type static converter as claimed in claim 9,
   wherein each switch with automatic switching (k1, k2) has a junction or an array of junctions (13, 14) connected in parallel to each transistor (11, 12); and
   further comprising two electrical switching stages arranged either side of an alternating voltage source (1) and each having two switches with automatic control (k1, k2) providing, for each of said stages, the opening and closing changes of state, respectively, each of said switches being composed of a transistor (11) and a junction (13) having a thyristor function.

14. A static converter as claimed in claim 1, further comprising at least one switch with automatic control (k1) whose two changes of state providing closing and opening are automatic.

15. A static converter as claimed in claim 1, further comprising at least one switch with automatic control (k1) whose one change of state providing closing or opening is automatic, and whose other change of state providing opening or closing is spontaneous.

16. A static converter as claimed in claim 15, wherein, for each switch (k1, k2) with automatic switching, with a view to providing each of the automatic changes of state of said switch:
   a differential voltage detector (15) connected in parallel to the output electrodes (3, 4) of said switch and designed to deliver a signal representing the absolute value of the voltage at the terminals of said electrodes,
   a voltage comparator (16, 17) connected to the voltage detector (15) and designed to deliver a change-of-state signal, at the opening or at the closing, when the predefined voltage threshold is reached,
   and switching means (5) connected to the voltage comparator (15) and designed to bring about a change of state in the switch (k1, k2), providing switching at the opening or at the closing on reception of the change-of-state signal; and
   further comprising, with a view to the spontaneous change of state providing closing switching, a change-of-state line (26) having an inverter (27) and connecting the voltage comparator (17) and the switching means (28).

* * * * *